April 18, 1933.                D. PARRETT                1,903,913
                              AXLE STRUCTURE
                           Filed Sept. 27, 1930        2 Sheets-Sheet 1
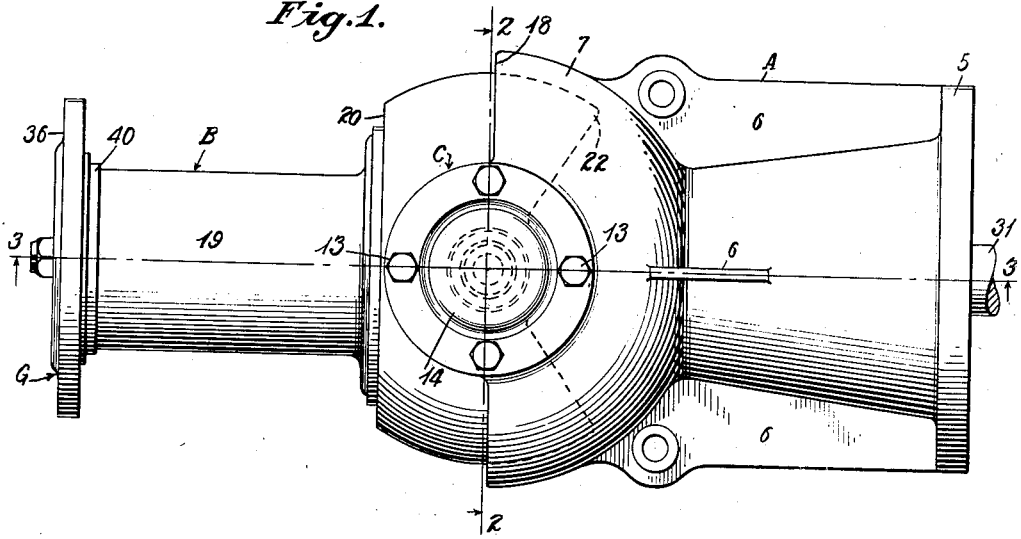
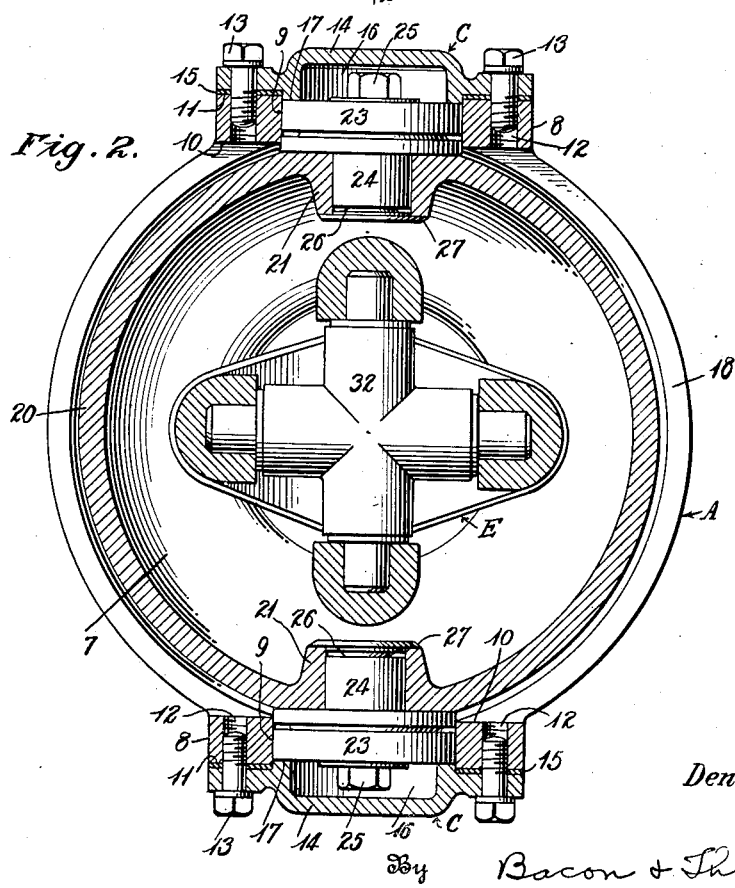
Inventor
Dent Parrett
By Bacon & Thomas
Attorneys April 18, 1933.　　　D. PARRETT　　　1,903,913
AXLE STRUCTURE
Filed Sept. 27, 1930　　　2 Sheets-Sheet 2

Inventor
Dent Parrett
By Bacon & Thomas
Attorneys

Patented Apr. 18, 1933

1,903,913

UNITED STATES PATENT OFFICE

DENT PARRETT, OF ST. JOSEPH, MICHIGAN, ASSIGNOR TO JOSEPH GOSSNER AND MATHIAS LEUPOLD, BOTH OF NEW YORK, N. Y.

AXLE STRUCTURE

Application filed September 27, 1930. Serial No. 484,918.

This invention relates to new and useful improvements in axle structures and deals more specifically with front wheel drive mechanism for motor vehicles particularly of the tractor type.

The primary object of the invention is to provide front wheel drive axle mechanism including novel housing and spindle structure which will permit of proper steering movement of the axle spindle with respect to the housing and will prevent dust, dirt, and other foreign matter from working into the enclosed mechanism.

A further object of the invention is to provide a novel form of connection between the housing and spindle of a driven steering wheel type of axle structure.

A still further object is to provide bearing mountings for a driving and steering wheel spindle which will permit longitudinal movement only of the spindle with respect to the vehicle of which it forms a part; said bearing mounting being dust and dirt-proof and easily lubricated.

Other objects and advantages of the invention will be apparent during the course of the following description.

In the accompanying drawings forming a part of this specification and in which like numerals are employed to designate like parts throughout the same:

Fig. 1 is a top plan view of the axle structure embodying this invention,

Fig. 2 is a vertical sectional view taken upon line 2—2 of Fig. 1, and

Figure 3:
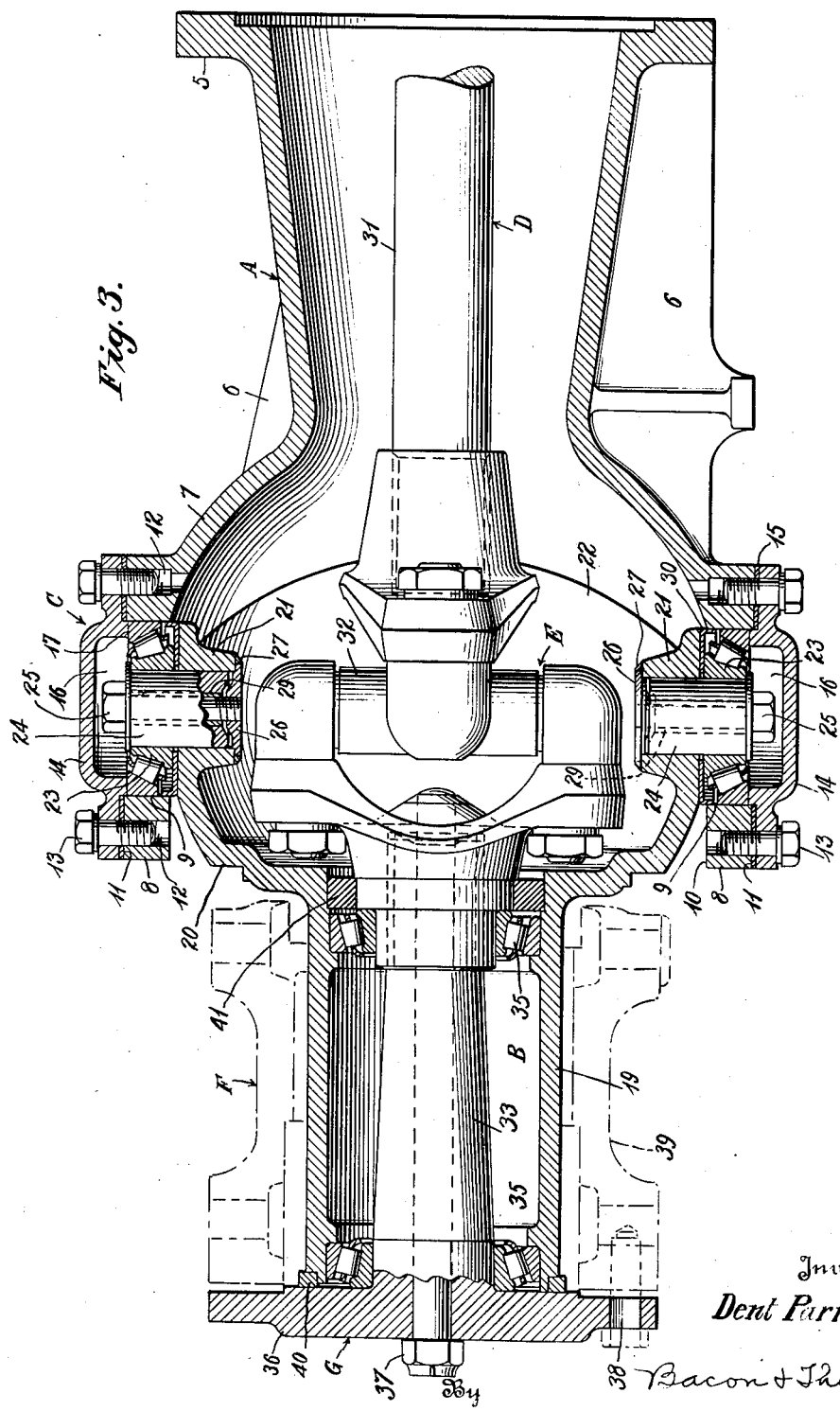
Fig. 3 is a longitudinal vertical sectional view taken upon line 3—3 of Fig. 1.

Briefly describing the invention disclosed in the accompanying drawings, the same consists of an axle housing section A to which is pivotally connected a spindle section B by means of the pivot joint structure C. Housed within the portions A, B and C is a driving and steering axle D having a universal joint E which divides the shaft into a housing part and a spindle part, the said universal joint being located within the joint structure C. The spindle B is formed to receive the hub F of a wheel structure having a driving connection G with the axle D.

The various structural units will now be described in detail for affording a better understanding of the invention.

The axle housing A is of hollow formation and is provided at its inner end with a radial flange 5 by means of which the said housing may be suitably connected to the remainder of the axle. In the preferred form of the invention, this flange 5 is directly bolted to the gear casing enclosing a differential drive mechanism. This differential drive mechanism is not disclosed as it forms no part of this invention. The housing A is suitably reinforced and strengthened by web structures 6 which extend longitudinally of the housing on various sides of the same. The forward end of the housing is formed into a socket portion 7 having at diametrically opposite points the ears 8 formed with co-axial bearing openings 9. The opposite faces 10 and 11 of these ears 8 preferably are flat and substantially parallel. Screw holes 12 are formed in the margins of these ears 8 for the reception of screws 13 by means of which the caps 14 may be secured to the ears 8 for closing the outer ends of the latter. Interposed between the ears and the caps are sealing members 15 which are retained in place by the screws 13. It will be noted that each cap 14 is formed with a lubricant receiving cavity 16. The wall of each one of these cavities is extended in the form of an annular flange 17 adapted to pass through the center of its associated packing member 15 for entering its associated bearing opening 9. The end walls 18 of the socket portion 7 terminate in a plane intersecting the axes of the bearing receiving openings 9.

A spindle B is formed with a wheel hub receiving portion 19 of hollow formation. The inner end of the wheel hub receiving portion 19 joins with an enlarged hollow ball member 20 which is adapted to be received within the socket portion 7 of the axle housing A. At diametrically opposite points, the ball portion 20 of the spindle is formed with hollow inwardly projecting bosses 21. The walls of the ball portion 20 of the spindle extend beyond the plane intersecting the axes of the bearing openings 9 to terminate in side wall portions 22 which overlap to a considerable extent the walls of the socket portion 7 of the axle housing A when the housing and spindle are operatively associated for the purpose of preventing dust, dirt and other foreign matter from entering the housing or spindle.

The joint structure C employed for pivotally connecting the spindle B to the housing A consists of a roller bearing cage 23 seated within each one of the bearing openings 9. The outer race of each bearing cage tightly fits the wall of the bearing opening. Received within the bore of the inner race of each roller bearing is an elongated tubular bushing 24 which projects from the roller bearing to be received within one of the hollow bosses 21 formed on the spindle. These bushings 24 function as journals for the spindle and are removably attached to the bosses 21 of the spindle by means of bolts 25 which extend through the bores of the bushings and are threadedly connected at their inner ends to anchor plates 26. These anchor plates are secured to the inner ends of the bosses 21 by means of welding, brazing, or the like, 27. A sleeve 29 is interposed between each bolt 25 and the bore of each journal bushing 24.

For the purpose of closing the inner ends of the bearing openings to prevent the entrance of foreign matter and for permitting the bearings to be packed with lubricant, a cup-shaped closure member 30 is provided for each bearing opening. Each cup-shaped closure member surrounds one of the bushings 24 and has an annular outer edge flange which tightly fits within a bearing opening 9. The cup-shaped members 30 are interposed between the outer faces of the bosses 21 and the inner faces of the inner races for the roller bearings 23.

The axle D is formed with an inner section 31 connected in any suitable manner to one side of a single universal joint 32. This universal joint may be of any desired form and has connected thereto the second section 33 of the axle. This second section extends through the wheel hub receiving portion 19 of the spindle and is supported therein by suitable anti-friction bearings 35. A driving plate 36 is secured by a bolt 37 or any other suitable form of mechanism to the outer section 33 of the driving and steering axle D. The bolt 37 extends through the driving plate 36 and extension 33 and is screwed into the flange of the universal joint so that the driving plate 36 is secured in position. There is a nut on the end of the bolt 37 which is in practice welded on to the universal joint flange. This plate is connected by any suitable means, such as driving pins 38, to the hub 39 of a wheel. Interposed between the driving plate 36 and the outer end of the spindle portion 19 is a packing member 40.

A second packing member 41 is interposed between the axle and the spindle portion 19 inwardly of the inner anti-friction bearing structure 35.

It now will be seen that a combined driving and steering axle structure has been provided which will permit the axle spindle to pivot horizontally only or in a longitudinal direction with respect to the vehicle of which it forms a part. The universal joint E of the axle will permit the outer section 33 of the axle to be driven irrespective of the angular position of the spindle with respect to the axle housing. The overlapping ball and socket fit between the spindle and the axle housing will effectively prevent the entrance of dust, dirt and other foreign matter to the mechanism housed within these members. The caps 14 and cup-shaped members 30 associated with the bearing openings 9 will effectively prevent entrance of dust, dirt and other foreign matter to the anti-friction bearings 23. By simply removing the caps 14, these bearings with their associated elements may be effectively packed with lubricant.

To assemble this axle structure, the axle sections 31 and 33 and the universal joint 32 are all properly interconnected. The spindle B is then positioned with its ball-shaped portion 20 arranged within the socket portion 7 of the axle housing. The anti-friction bearings 23 are then positioned within the bearing openings 9 and the bushings 24 are then inserted through the inner races of the anti-friction bearings 23 and into the bores of the hollow bosses 21 formed on the spindle. These bushings are then secured in place by the bolts 25 which are passed through the bores of the bushings and are connected to the members 26 which are suitably secured to the inner ends of the bosses 21. After being connected in this manner, the outer ends of the bushing openings may be closed by securing the caps 14 in place. The hub F of the wheel then may be positioned upon the spindle portion 19 and the driving plate 36 secured in place by means of the bolt 37. The anti-friction bearings 35 and the packing members 40 and 41 of course are to be properly positioned during the assembling of the spindle upon the axle section 33.

Suitable supply and drain openings may be provided for supplying lubricant to the interior of the axle housing and spindle. Openings with their closures have not been disclosed as they form no part of this invention. Also, no attempt has been made to illustrate any form of connection between the spindle B and steering mechanism as I do not desire to limit myself to any particular structure. It is to be understood, however, that some suitable form of connection may be provided for attaching the steering mechanism to the said spindle B.

It is to be understood that the form of this invention herewith shown and described is to be taken as a preferred example of the same, and that various changes in the shape, size and arrangement of parts may be resorted to without departing from the spirit of the invention or the scope of the subjoined claims.

Having thus described my invention, I claim:

1. An axle structure of the type described comprising, an open ended housing having co-axial ears at its open end formed with bearing receiving openings, bearings positioned in said openings, a hollow spindle having aligned hollow bosses, and tubular bushings detachably received in the bosses of said spindle and in said bearings for pivotally supporting the spindle on said housing.

2. An axle structure of the type described comprising, a housing having co-axial ears formed with bearing receiving openings, bearings positioned within said openings, a hollow spindle, a bushing journalled in and projecting from each of said bearings, and means for detachably connecting said bushings to said spindle.

3. An axle structure of the type described comprising, a housing, a hollow spindle, said housing and spindle having interfitting ball and socket members, co-axial bearing receiving openings formed in one of said members, bearings fitted in said openings, journal devices attached to the other of said members and received in said bearings and a cup-shaped closure member surrounding each journal device and having an edge flange fitting a bearing opening to close an end of the latter.

4. An axle structure of the type described comprising, a housing, a hollow spindle, said housing and spindle having interfitting ball and socket members, co-axial bearing receiving openings formed in one of said members, bearings fitted in said openings, journal devices attached to the other of said members received in said bearings, means removably attached to the member having the bearing openings for closing one end of each opening, and means surrounding the journal devices and fitting in said bearing openings for closing the second end of each of said openings.

5. An axle structure of the type described, comprising a housing having co-axial ears formed with bearing receiving openings, a spindle having co-axial openings to be aligned with the bearing openings, a bearing positioned in each of the bearing openings, a tubular member received in each of said bearings and extending into an opening of the spindle, and means passing through each tubular member and connected to the spindle for attaching the tubular members to the spindle.

6. An axle structure of the type described, comprising a housing having co-axial ears formed with bearing receiving openings, a spindle having co-axial openings to be aligned with the bearing openings, a bearing positioned in each of the bearing openings, a tubular journal detachably received in each of the bearings and extending into an opening of the spindle, and means for retaining the tubular members positioned with respect to the bearings and spindle.

In testimony whereof I affix my signature.

DENT PARRETT.